United States Patent [19]

Lin

[11] Patent Number: 5,496,114

[45] Date of Patent: Mar. 5, 1996

[54] BOTTOM BRACKET BEARING AXLE MOUNTING STRUCTURE FOR BICYCLES

[76] Inventor: Wen-Hwa Lin, No. 262, Sec. 1, Chung San Rd., Ta Chia Chen, Taichung Hsien, Taiwan

[21] Appl. No.: 372,343

[22] Filed: Jan. 13, 1995

[51] Int. Cl.⁶ ........................................ F16C 19/08
[52] U.S. Cl. .................... 384/458; 384/513; 384/515; 384/540; 384/545
[58] Field of Search ........................... 384/458, 545, 384/512, 540, 513, 515

[56] References Cited

U.S. PATENT DOCUMENTS 3,578,829   5/1971   Hata ............................ 384/458
4,606,658   8/1986   Hofmann et al. .............. 384/458
5,118,205   6/1992   Hoffmann ..................... 384/512
5,209,581   5/1993   Nagano ........................ 384/512

Primary Examiner—Lenard A. Footland
Attorney, Agent, or Firm—Varndell Legal Group

[57] ABSTRACT

A bottom bracket bearing axle mounting structure including a barrel received in the transverse mounting hole of the bottom bracket of a bicycle to hold an axle, a first screw cap threaded into one end of the transverse mounting hole to hold a first ring of balls on a first ball bearing on the axle, and a second screw cap threaded onto one end of the barrel and into an opposite end of the transverse mounting hole to hold a second ring of balls on a second ball bearing on the axle.

1 Claim, 4 Drawing Sheets

BOTTOM BRACKET BEARING AXLE MOUNTING STRUCTURE FOR BICYCLES

BACKGROUND AND SUMMARY OF THE INVENTION

The present invention relates to a bottom bracket bearing axle mounting structure for bicycles which uses two screw caps fastened to the two opposite ends of the transverse mounting hole of the bicycle bottom bracket to hold a barrel and two rings of balls around the axle.

The bottom bracket bearing axle is the source of the power output of a bicycle, which is mounted on the bottom bracket and supported on balls and coupled with cranks and pedals for turning by the legs. The coefficient of friction between the balls and the axle has great concern with the operation of the bicycle. If the balls are not firmly retained in place during the rotary motion of the axle, the movement of the axle will become unstable. FIGS. 1 and 2 show a bottom bracket bearing axle mounting structure according to the prior art which is generally comprised of a barrel, an axle, two rings of balls, a ball bearing block, a nut, and a screw cap. The barrel comprises a longitudinal center through hole, two horn-like orifices at two opposite ends, and two ball bearings disposed between the longitudinal center through hole and the horn-like orifices. The axle comprises an outer thread and a collar near two opposite ends, and an annular groove near the collar. The rings of balls are respectively mounted around the axle and supported on the ball bearings. The ball bearing block comprises a curved bearing wall matched with one ball bearing to hold one ring of balls, an center screw hole threaded onto the outer thread of the axle. The nut is threaded onto the outer thread of the axle and stopped at one end of the ball bearing block. During the assembly, process, the screw cap is threaded into one end of the bottom bracket, then a rubber ring is mounted around the annular groove on the axle, then the ring of balls is mounted on the ball bearing of the barrel, and then the ring of balls is covered with grease, and then the barrel is sleeved onto the axle, and then the ring of balls is mounted on the ball bearing, and then the ball bearing block and the nut and the oil seal ring are respectively threaded onto the outer thread of the axle. This bottom bracket bearing axle mounting structure is complicated and inconveneint to install. When the axle is rotated, the rings of balls tend to displace, causing the axle vibrated. Furthermore, the position of the ball bearing block on the axle must be accurately calibrated so that the friction between the ring of balls and the axle can be controlled within the optimum range. However, calibrating the positioning of the ball bearing block is not an easy job and requires special techniques.

The present invention has been accomplished to provide a bottom bracket bearing axle mounting structure which eliminates the aforesaid problems. It is one object of the present invention to provide a bottom bracket bearing axle mounting structure which consists of less number of parts. It is another object of the present invention to provide a bottom bracket bearing axle mounting structure which is easy to install. It is still another object of the present invention to provide a bottom bracket bearing axle mounting structure which is stable in operation. To achieve these objects, there is provided a bottom bracket bearing axle mounting structure comprised of a barrel received in the transverse mounting hole of the bottom bracket of a bicycle to hold an axle, a first screw cap threaded into one end of the transverse mounting hole to hold a first ring of balls on a first ball bearing on the axle, and a second screw cap threaded onto one end of the barrel and into an opposite end of the transverse mounting hole to hold a second ring of balls around a second ball bearing on the axle.

DETAILED DESCRIPTION OF THE PREFERRED EMBODIMENT

Figure 1:
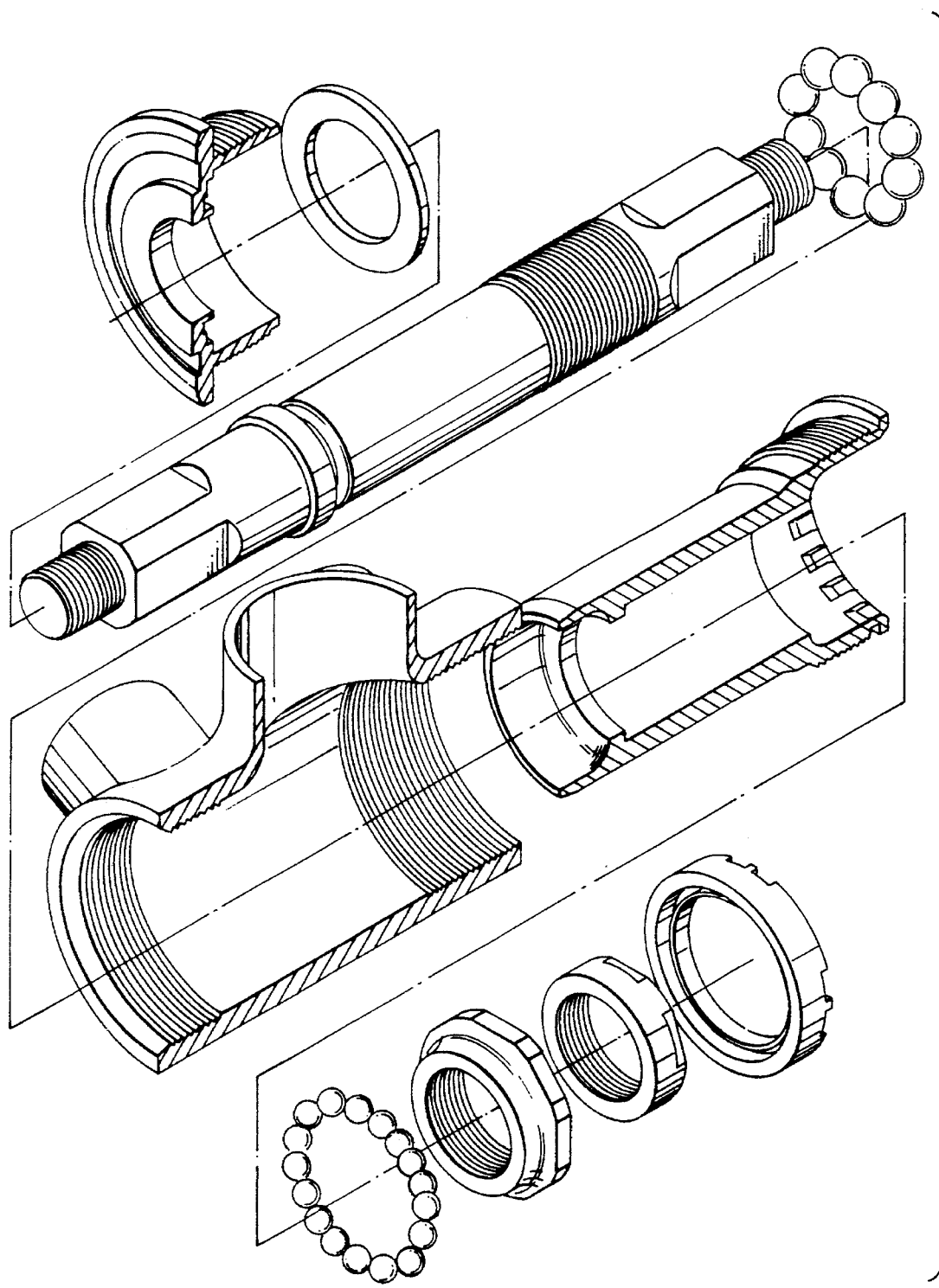
FIG. 1 is an exploded view of a bottom bracket bearing axle mounting structure according to the prior art.
Figure 2:
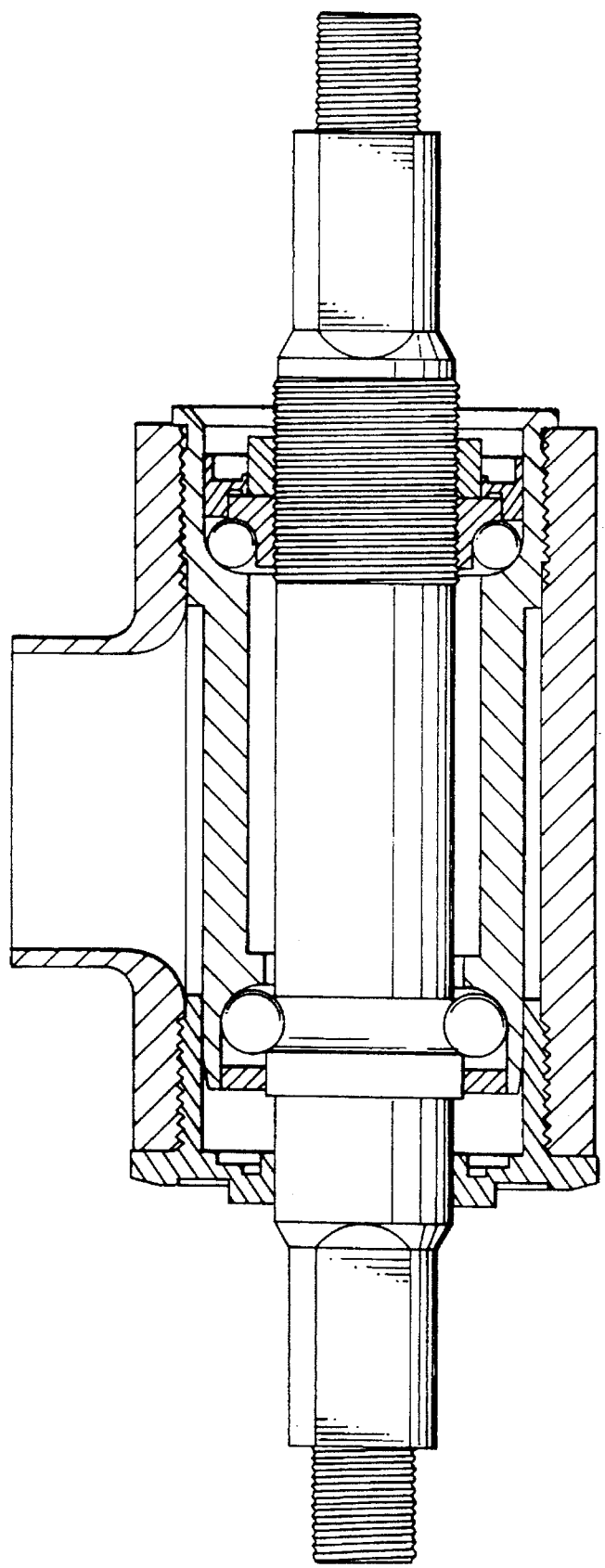
FIG. 2 is an assembly view in section of the bottom bracket bearing axle mounting structure shown in FIG. 1.
Figure 3:
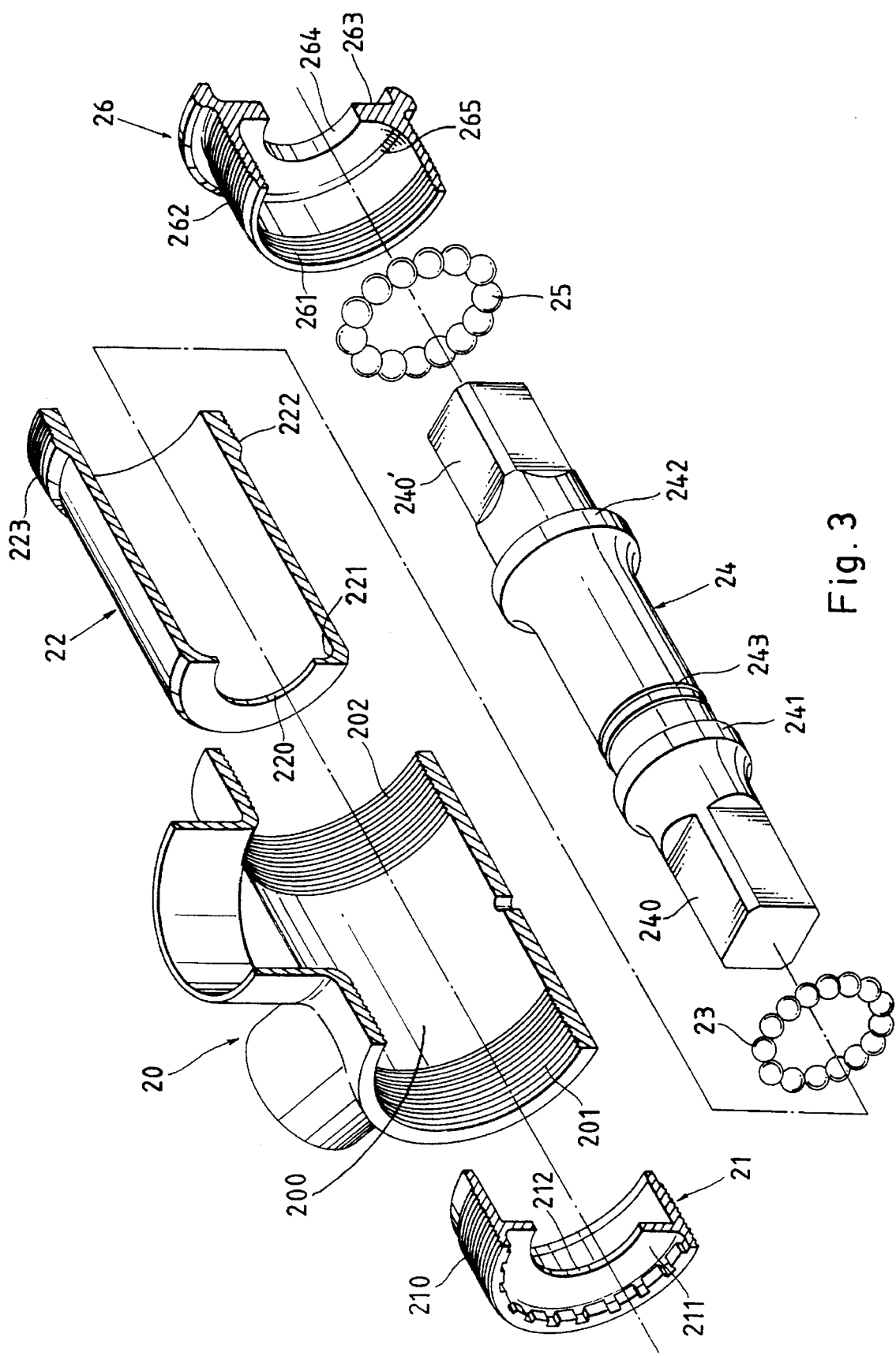
FIG. 3 is an exploded view of a bottom bracket bearing axle mounting structure according to the present invention.
Figure 4:
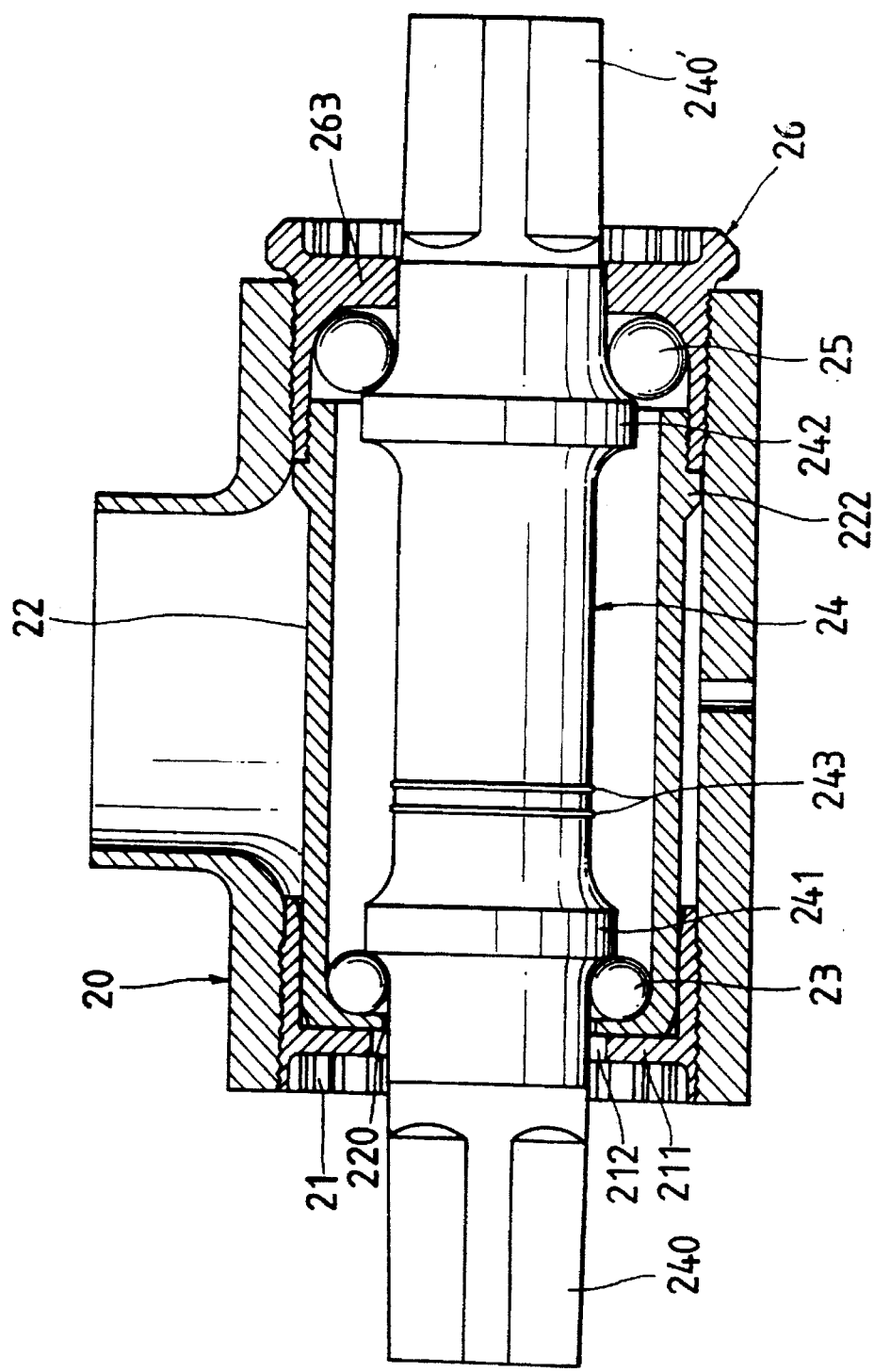
FIG. 4 is an assembly view in section of the bottom bracket bearing axle mounting structure shown in FIG. 3.

Referring to FIGS. 3 and 4, a bottom bracket bearing axle mounting structure is shown comprising a bracket 20, a left screw cap 21, a barrel 22, a first ring of balls 23, an axle 24, a second ring of balls 25, and a right screw cap 26. The bracket 20 comprises two inner threads 201 and 202 at the two opposite ends of a transverse mounting hole 200 thereof. The barrel 22 is mounted within the transverse mounting hole 200 of the bracket 20. The left screw cap 21 and the right screw cap 26 are respectively fastened to the two opposite ends of the transverse mounting hole 200 of the bracket 20 to hold the barrel 22 and the axle 24. The first ring of balls 23 and the second ring of balls 25 are respectively mounted around the axle 24 and received inside the left screw cap 21 and the right screw cap 26. The axle 24 comprises two square rods 240 and 240' at two opposite ends respectively extended out of the left screw cap 21 and the right screw cap 26, two ball bearings 241 and 242 spaced between the square rods 240 and 240' for bearing the first ring of balls 23 and the second ring of balls 25 respectively, and two annular grooves 243 near the left-sided ball bearing 241 for easy recognition of the mounting direction.

Referring to FIGS. 3 and 4 again, the left screw cap 21 comprises an outer thread 210 threaded into one inner thread 201 of the bracket 20, an inside annular flange 211 at one end, which stops one end of the barrel 22, and a center through hole 212 surrounded by the annular flange 211 through which one square rod 240 of the axle 24 passes. The barrel 22 comprises a longitudinal center through hole 220, through which the axle 24 passes, a ball bearing 221 on the inside at one side, which bears the first rig of balls 23, an outside flange 222 raised from the periphery near one end and stopped against one end of the right screw cap 26, and an outer thread 223 connected to one end of the right screw cap 26. The right screw cap 26 comprises an inner thread 261 threaded onto the outer thread 223 of the barrel 22, an outer thread 262 threaded into one inner thread 202 of the bracket 20 opposite to the left screw cap 21, an inside annular flange 263 at an opposite end defining a ball bearing 265, which bears the second ring of balls 25, and a longitudinal center through hole 264 surrounded by the inside annular flange 263 through which one square rod 240' of the axle 24 passes.

I claim:

1. A bottom bracket bearing axle mounting structure comprising a bracket having a transverse mounting hole and a first inner thread and a second inner thread at two opposite ends of said transverse mounting hole, a barrel mounted within said transverse mounting hole, an axle inserted through said barrel, a left screw cap and a right screw cap respectively fastened to the two opposite ends of said transverse mounting hole to hold said barrel and said axle, a first ring of balls and a second ring of balls respectively mounted around said axle and received inside said left screw cap and said right screw cap respectively, said axle comprising a first square rod at one end extended out of said left screw cap, a second square rod at an opposite end extended out of said right screw cap, two ball bearing races spaced between said first and second square rods to bear said first ring of balls and said second ring of balls respectively, and two annular grooves near one ball bearing for easy recognition of the mounting direction, wherein:

said left screw cap comprises an outer thread threaded into said first inner thread of said bracket, an inside annular flange at one end, which stops one end of said barrel, and a center through hole through which said first square rod of said axle passes;

said barrel comprises a longitudinal center through hole, through which said axle passes, a ball bearing race on the inside at one side, which bears said first ring of balls, an outside flange stopped against one end of said right screw cap, and an outer thread connected to one end of said right screw cap; and said right screw cap comprises an inner thread threaded onto the outer thread of said barrel, an outer thread threaded into the second inner thread of said bracket, an inside annular flange at an opposite end defining the a ball bearing race, which bears said second ring of balls, and a longitudinal center through hole, through which said second square rod of said axle passes.

\* \* \* \* \*